United States Patent [19]

Kagawa

[11] Patent Number: 4,657,830
[45] Date of Patent: Apr. 14, 1987

[54] SODIUM-SULFUR STORAGE BATTERY

[75] Inventor: Hiroshi Kagawa, Takatsuki, Japan

[73] Assignee: Yuasa Battery Co. Ltd., Osaka, Japan

[21] Appl. No.: 827,917

[22] Filed: Feb. 10, 1986

[30] Foreign Application Priority Data

Feb. 19, 1985 [JP] Japan .................................. 60-30726

[51] Int. Cl.$^4$ .............................................. H01M 4/36
[52] U.S. Cl. ..................................... 429/104; 429/174
[58] Field of Search ......................... 429/103, 104, 174

[56] References Cited

U.S. PATENT DOCUMENTS

| | | | |
|---|---|---|---|
| 3,884,715 | 5/1975 | Gay et al. | 429/103 |
| 4,038,464 | 7/1977 | Baukal et al. | 429/104 |
| 4,052,535 | 10/1977 | Robinson et al. | 429/104 |
| 4,360,574 | 11/1982 | Park | 429/103 X |

Primary Examiner—Brian E. Hearn
Assistant Examiner—Stephen J. Kalafut
Attorney, Agent, or Firm—Burns, Doane, Swecker & Mathis

[57] ABSTRACT

The sodium sulfur storage battery comprises a solid electrolyte tube; metallic fiber filled in said solid electrolyte tube; powder, grain or mixture of them of substance resistant to attack by molten sodium which has porosity smaller than that of the metallic fiber and is filled in a first space above the metallic fiber; a battery housing; a positive electroconductive material disposed in a space between the battery housing and the solid electrolyte tube; a ring disposed on the upper surface of the positive electroconductive material; powder, grain or mixture of them of substance resistant to attack by molten sulfur which is filled in a second space above said ring and is prevented from dropping by said ring; and a solder glass layer arranged on a portion of the outer peripheral surface of the solid electrolyte tube in said second space.

9 Claims, 2 Drawing Figures

SODIUM-SULFUR STORAGE BATTERY

BACKGROUND OF THE INVENTION

The present invention relates to a sodium-sulfur storage battery, and more particularly, to a structure thereof.

Generally, a sodium-sulfur storage battery is a secondary battery of a high temperature type, in which sodium used as negative reactant and sulfur used as positive reactant are completely separated from each other by a sodium ion conductive solid electrolyte tube such as beta-two-dash alumina, and is a high performance battery having theoretical capacities of which discharging capacity is 100 with respect to a charging capacity of 100, i.e., a ration of discharging and charging capacities is 100:100.

However, in actual use, said theoretical capacities can not be obtained because of problems such as low utilizing factor of the negative reactant, low utilizing factor of the positive reactant and insufficient gastightness in a thermocompressively jointed portion.

The above problem is detailed below with reference to FIG. 2, which is a sectional view of a conventional sodium-sulfur storage battery. In FIG. 2, an upper end of a solid electrolyte tube 1 is jointed with solder glass to an alpha-alumina ring 2, of which lower surface is thermocompressively jointed to a positive cover 3 with an aluminum layer therebetween. The outer periphery of the cover 3 is welded to an upper end of a battery housing 4. Sulfur used as positive reactant 5 is impregnated in positive electroconductive material 6 such as graphite felt and is disposed between the battery housing 4 and the solid electrolyte tube 1. A bottom cover 7 is arranged in the housing 4 and is welded at its periphery to the lower end of the housing 4. Metallic fiber 9 such as stainless steel is filled in the solid electrolyte tube 1. A negative collector tube 10 welded to a negative cover 11 is inserted into the tube 1. The outer periphery of the negative cover 11 is welded to a negative auxiliary cover 8 which is thermocompressively jointed to the upper surface of the alpha-alumina ring 2 with an aluminum layer therebetween. The negative collector tube 10 is sealed by vacuum welding after sodium used as negative reactant 12 is impregnated in vacuum condition through the negative collector tube 10.

The sodium-sulfur storage battery having above-noted structure has following disadvantages. The sodium used as the negative reactant 12 spreads above the metallic fiber 9 filled in the solid electrolyte tube 1, and said spread sodium does not contribute to the discharging, which reduces the utilizing factor of the negative reactant. Further, since the above spread sodium occupies a position higher than an upper surface 6' of the positive electroconductive material 6, it may contact the positive reactant 5 through the solid electrolyte tube 1 and react directly with it, in which case heat is generated. By this heat, the solid electrolyte tube 1 may be broken, and the thermocompressively jointed portion of the alpha-alumina ring 2 and the negative auxiliary cover 8 may be corroded, which causes insufficient gas tightness. On the other hand, when the positive reactant 5 discharges, the volume thereof increases and the liquid level of the positive reactant 5 rises, so that the reactant 5 wets the upper inner surface of the battery housing 4 and the lower surface of the positive cover 3. In the subsequent charging operation, the reactant 5 which has wetted the surfaces may remain there without being charged. This reduces the utilizing factor of the positive reactant 5. Further, the positive reactant 5 which has wetted the lower surface of the positive cover 3 may cause corrosion and insufficient gastightness at the thermocompressively jointed portion of the positive cover 3 and the alpha-alumina ring 2.

Accordingly, it is an object of the invention to provide a sodium-sulfur storage battery, in which utilizing factors of positive and negative reactant are improved, and in which insufficient gastightness and breakage of a solid electrolyte tube are prevented.

SUMMARY OF THE INVENTION

According to the invention, a sodium-sulfur storage battery comprises a solid electrolyte tube; metallic fiber filled in said solid electrolyte tube; powder, grain or mixture of them of substance resistant to attack by molten sodium which has porosity smaller than that of the metallic fiber and is filled in a first space above the metallic fiber; a battery housing; a positive electroconductive material disposed in a space between the battery housing and the solid electrolyte tube; a ring disposed on the upper surface of the positive electroconductive material; powder, grain or mixture of them of substance resistant to attack by molten sulfur which is filled in a second space above said ring and is prevented from dropping by said ring; and a solder glass layer arranged on a portion of the outer peripheral surface of the solid electrolyte tube in said second space.

The embodiment of the invention is described by way of example, with reference to the accompanying drawings.

DETAILED DESCRIPTION OF THE PREFERRED EMBODIMENTS

Figure 1:
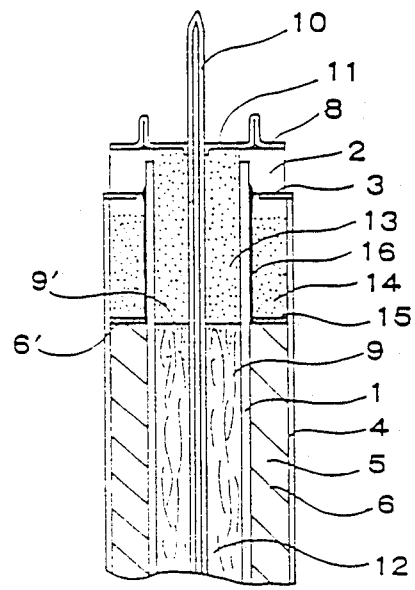
FIG. 1 is a fragmentary sectional view of a sodium-sulfur storage battery of an embodiment of the invention.
Figure 2:
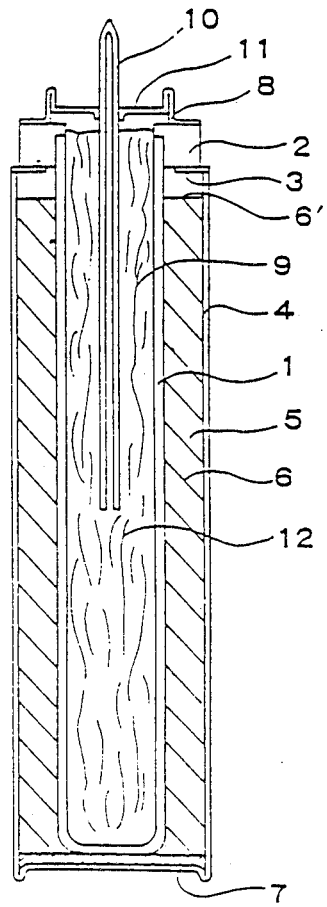
FIG. 2 is a sectional view of a conventional sodium-sulfur storage battery.

Referring to FIG. 1, same parts and members as those in FIG. 2 bear same reference numbers. 13 indicates alpha-alumina powder which is used as substance which has sufficient resistance to chemical and electrochemical attack by molten sodium and is filled in a first space above a metallic fiber 9. Porosity of the powder 13 is set smaller than that of the metallic fiber 9 so as to prevent spreading of negative reactant 12. 14 indicates powder or grain of alpha-alumina, powder or grain of glass, or mixture of them, which functions as substance having sufficient resistance to chemical and electrochemical attack by molten sulfur and is filled in a second space above positive electroconductive material 6. Said substance 14 is prevented from dropping and falling by a graphite felt ring 15. A solder glass layer 16 is applied on the outer peripheral surface of a portion of the solid electrolyte tube 1 which is positioned in said second space. In the example of the invention, the metallic fiber 9 filled in a solid electrolyte tube 1 and the positive electroconductive material 6 are so arranged that the upper surfaces 9' and 6' of them may be horizontally aligned, and a vertical space of about 15 mm (millimeter) is formed between the upper surface 6' of the positive electroconductive tube 6 and the lower surface of an alpha-alumina ring 2. Alpha-alumina powder of about 30 to 80 mesh, which is used as said powder, is filled in the space above the metallic fiber 9 and partially enters the metallic fiber 9. Alumina glass powder of about 30 to 80 mesh and about 100 to 200 mesh, which is used as said mixture, is filled in the space above the positive electroconductive fiber 6, of which lower end is covered by the ring 15 made of the graphite felt for preventing the mixture from dropping. The solder glass layer 16 is 0.5 mm in thickness.

Ten cells of said structure of the example and ten cells of the conventional structure in FIG. 2 were manufactured and tested for testing the utilizing factor of the negative reactant, the utilizing factor of the positive reactant and generation of the insufficient gastightness in the thermocompressively jointed portion between the alpha alumina ring 2 and the solid electrolyte tube 1. The result of the test is described in a following table-1.

TABLE 1

| Tested Matters | | Battery of the Invention | Conventional Battery |
|---|---|---|---|
| Utilizing Factor of Negative Reactant | Over 90% | 1 cell | 0 cell |
| | 85-90% | 7 cell | 4 cell |
| | 75-85% | 2 cell | 5 cell |
| | Below 75% | 0 cell | 1 cell |
| Utilizing Factor of Positive Reactant | Over 90% | 7 cell | 1 cell |
| | 80-90% | 3 cell | 1 cell |
| | 70-80% | 0 cell | 6 cell |
| | Below 70% | 0 cell | 2 cell |
| Insufficient Gastightness | Existed | 0 cell | 6 cell |
| | Non | 10 cell | 4 cell |

As apparent from the table-1, in the battery of the invention, both the utilizing factor of the negative reactant and the utilizing factor of the positive reactant are improved, and the insufficient gastightness in the thermocompressively jointed portion is completely avoided.

The reason by which 15 mm is set as the length of the space between the upper surface 6' of the positive electroconductive material 6 and the lower surface 2' of the alpha-alumina ring 2 is to prevent rising of the liquid level of the positive reactant 5 by the substance 14 having resistance to the molten sulfur, and the space of at least 10 mm is required between the surfaces 6' and 2'. The reason by which the thickness of the solder glass layer 16 is set at 0.5 mm is to prevent deposition of the sodium used as the negative reactant 12 into the solid electrolyte tube 1. If the layer 16 were excessively thick, it might crack and break the solid electrolyte tube 1 when the temperature rose. Therefore, the thickness of the layer 16 is properly 1 mm or less. However, there is substantially no limitation with respect to the filled densities, grain sizes and fiber diameters of the metallic fiber 9, the substance 13 resistant to the molten sodium, the substance 14 resistant to the molten sulfur and the positive electroconductive material 6. These can be substantially set at appropriate values substantially without limitation.

According to the sodium-sulfur storage battery of the invention, as described hereinbefore, the utilizing factor of the negative reactant and the utilizing factor of the positive reactant can be improved, and the insufficient gastightness is completely avoided at the thermocompressively jointed portion, so that reliability is remarkably improved.

What is claimed is:

1. A sodium-sulfur storage battery comprising a solid electrolyte tube; metallic fiber filled in said solid electrolyte tube; a powder, grain or mixture thereof of a substance resistant to attack by molten sodium which has a porosity smaller than that of the metallic fiber and is filled in a first space above the metallic fiber; a battery housing; a positive electroconductive material disposed in a space between the battery housing and the solid electrolyte tube; a ring disposed on the upper surface of the positive electroconductive material; a powder, grain or mixture thereof of a substance resistant to attack by molten sulfur which is filled in a second space above said ring and is prevented from dropping by said ring; and a solder glass layer arranged on a portion of the outer peripheral surface of the solid electrolyte tube in said second space.

2. A sodium-sulfur storage battery as claimed in claim 1 wherein said powder or grain of the substance resistant to the molten sodium is powder or grain of alpha-alumina.

3. A sodium-sulfur storage battery as claimed in claim 1 wherein said powder or grain of the substance resistant to the molten sulfur is powder or grain of alpha-alumina, or powder or grain of glass.

4. A sodium-sulfur storage battery as claimed in claim 1 wherein said ring for preventing dropping is a graphite felt ring.

5. A sodium-sulfur storage battery as claimed in claim 1 wherein said second space has a length of at least 10 mm between the upper surface of the positive electroconductive material and a lower surface of an alpha-alumina ring jointed to the solid electrolyte tube.

6. A sodium-sulfur storage battery as claimed in claim 1 wherein said solder glass layer has a thickness of 1 mm or less.

7. A sodium-sulfur storage battery as claimed in claim 1 wherein the first space extends higher than the second space.

8. A sodium-sulfur storage battery as claimed in claim 1 wherein the metallic fiber and the positive electroconductive material have upper surfaces which are horizontally aligned.

9. A sodium-sulfur storage battery as claimed in claim 1 wherein the powder, grain or mixture thereof filled in a first space above the metallic fiber partially enters the metallic fiber.

* * * * *